Aug. 2, 1949.　　　　　H. G. KAMRATH　　　　　2,478,109
OIL FILTER

Filed Jan. 18, 1946　　　　　　　　　　　　2 Sheets-Sheet 1

Inventor
Herbert G. Kamrath
By
Blackmor, Spencer & Hirt
Attorneys

Aug. 2, 1949.  H. G. KAMRATH  2,478,109
OIL FILTER
Filed Jan. 18, 1946  2 Sheets-Sheet 2
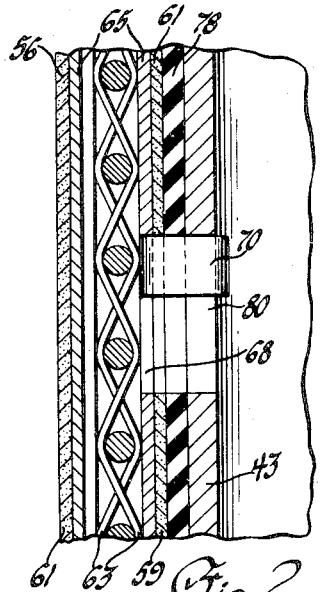
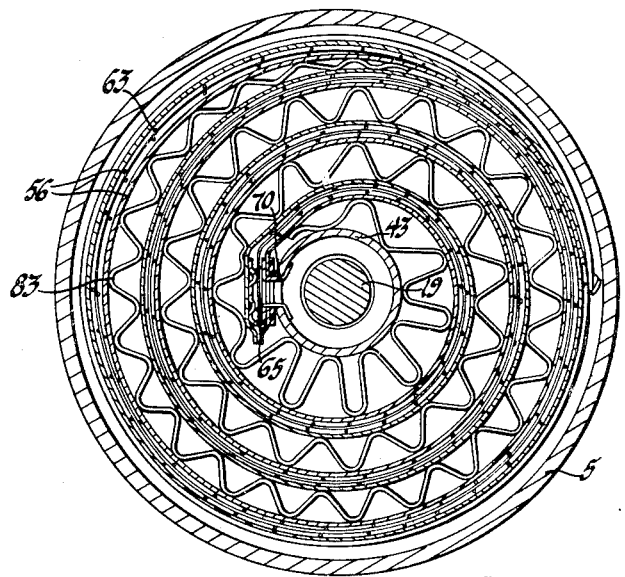
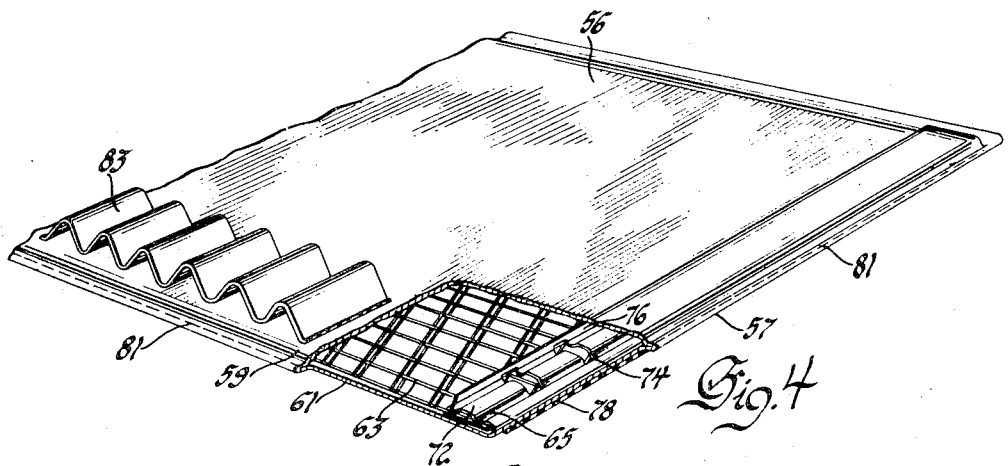
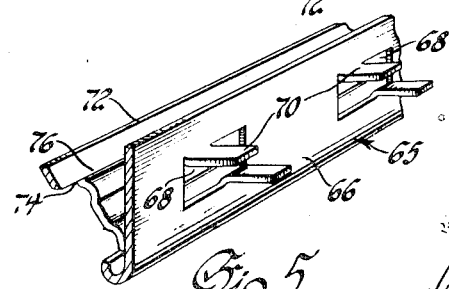
Inventor
Herbert G. Kamrath Patented Aug. 2, 1949

2,478,109

UNITED STATES PATENT OFFICE 2,478,109

OIL FILTER

Herbert G. Kamrath, Flint, Mich., assignor to General Motors Corporation, Detroit, Mich., a corporation of Delaware Application January 18, 1946, Serial No. 641,908

9 Claims. (Cl. 210—165)

The invention herein described is an improved oil filter. It is intended more particularly for use with engines to filter the oil used for lubrication.

An object is to provide an efficient, simple and comparatively inexpensive filter to be placed in the conduit of an oil circulating system between a conventional pump and the bearings to be lubricated.

Other objects and advantages will be understood from the description which follows.

On the accompanying drawings:

Fig. 2 is similar section on an enlarged scale of a part shown on Fig. 1.

Fig. 3 is a section substantially on line 3—3 of Fig. 1.

Fig. 4 is a view in perspective, partly broken away to illustrate the filtering member.

Fig. 5 is a detail of one of the parts.

Figure 1:
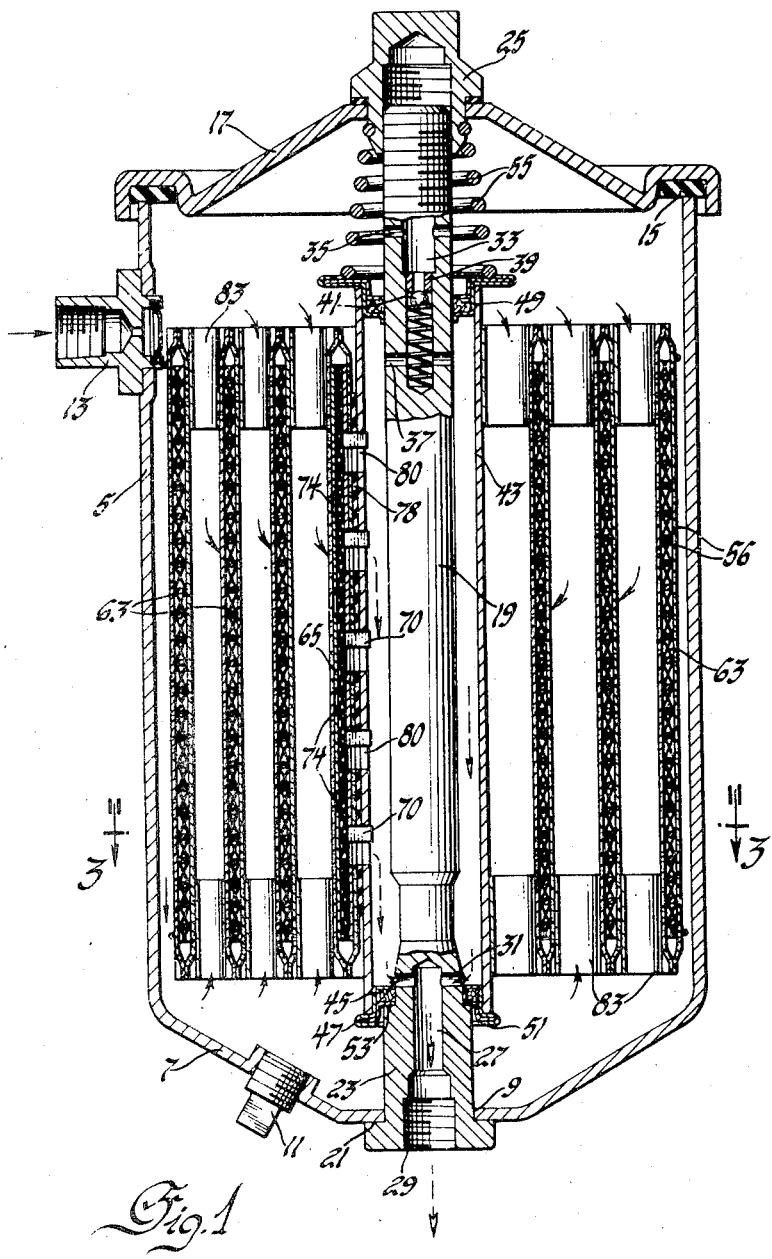
Fig. 1 is a longitudinal section through the filter.

Referring by reference numerals to the drawings, the filter is shown as housed within a casing 5 of generally cylindrical form and having a conical end at 7. In that end there is an axial opening 9 and a second drain opening closed by a removable plug 11. The side wall has an opening to receive an oil inlet fitting 13.

Over the upper end of casing 5 is a gasket 15. A conical cover 17 at its periphery is in contact with the gasket. To complete the housing assembly is a center post 19. It has a shoulder 21 near one end 23. The center post is projected through the center opening 9 and its shoulder contacts with the casing end 7 around the opening. The center post extends through the casing to a point near the cover 17 and is there threaded to engage a locking nut 25 which is shouldered to engage and position the cover 17 against the gasket 15. The center post has near end 23 an axial passage 27 internally threaded at 29 to engage a conduit, not shown, to carry filtered oil to the bearings. At the inner end of passage 27 radial passages 31 afford communication between passage 27 and the outside of the post. At the other end of the post 19 is an axial passage 33 communicating with the region outside the post by spaced radial passages 35 and 37. Within passage 33 is an apertured plug 39 engaged by a spring-pressed ball 41.

The filtering element is within the casing and assembled on the center post. It is built about and upon a center tube 43. Two concentric sleeves such as 45 and 47 so marked at one end, are fitted within each end of the center tube. Each sleeve has an internally directed flange between which flanges is a sealing ring 49. These sealing rings prevent communication between the annular space between the post and tube and the remainder of the space within the casing. At the ends of the tube the sleeves are formed with outwardly directed flanges one, such as 51, being longer than the other and bent over it to clamp the two together. When the center tube is assembled within the casing the inner flange of sleeve 47 rests on a shoulder 53 of the center post. A spring 55 between the cap 25 and the longer outward flanges of the sleeves at the other end of the center tube is compressed in securing the locking nut to the post to hold the tube firmly against the shoulder 53.

The filtering element is made from a strip of paper 56 having a width a little less than the length of the center tube. It is folded at about the middle of the length as at 57 to form a double layer 59, 61 so marked on Fig. 4. Between layers 59 and 61 there is placed a separator 63 in the form of a mesh element of substantially the same dimension as each paper layer 59 or 61. In assembling the paper and separator there is placed within the fold 57 of the paper a metallic collector manifold 65. It is, when assembled, of U-shape and embraces the end of the separator 63.

The manifold is folded as shown by Fig. 5. One side 66 is flat. In that side are cut openings 68 from which project tongues 70. The other side, 72 is formed with cut-out regions 74 between which the metal is folded as at 76. When the parts are assembled as shown by Fig. 2 the tongues project through the layer 61 of the paper with a hole between the tongues, through a washer 78 and through an aperture 80 in the tube and within the tube they are bent over (see Fig. 3) to secure the inner convolution of the folded paper together with the separator and manifold to the tube. Upon pressing together the two sides 66 and 76 of the manifold the mesh separator is firmly gripped as is perhaps best shown by Fig. 4. Fig. 1 shows several of these devices along the length of the tube for attaching the filtering member.

It should be stated that the edges of the folded paper are stitched as shown at 81. At the fold the separator and manifold space the layers 59 and 61 so that a chamber is formed at the innermost convolution from which filtered oil is to flow through holes 68 and 80 into the elongated annular space between the tube and the post.

In wrapping the filter element there are placed at its top and bottom regions and between the convolutions spacing strips of corrugated paper marked 83.

The oil enters the casing at 13. It fills the chamber flowing freely as will be seen by the arrows except that the seals at the two ends of the tube keep it from entering the annular space between the post and the tube. With pressure from the pump or other source the oil passes through one or more of the layers of paper finally reaching the chamber at the innermost convolution from which it enters the annular space around the post. From this space it flows through passages 31 and 27 to such a delivery pipe as may be connected to the filter at 29.

In the above description the filter element has been referred to as of paper. It should be explained that the paper to be used is specially treated to serve as a filtering element. Since the present invention is not directed to the specific paper used nor to its preparation, it is unnecessary to go into detail as to this. The valve device in the center post marked by numerals 39, 41 is intended as an emergency by-pass. In the event that the paper becomes clogged so that oil cannot reach the center tube, the developed pressure within the casing causes the oil to flow through passages 35 and 33, through the valve, and by way of passage 37 to the space between the post and center tube.

The separator may be of metal but I prefer to make it of paper using the same material as that used for the folded paper.

I claim:

1. A filter element comprising a center tube having a radial aperture, a double layer of paper wrapped spirally about said tube, a manifold between the layers of said double layer of paper at the innermost convolution, a tongue bent from said manifold providing an aperture in said manifold, a hole in one layer of said paper larger than said tongue to provide a passage through said one layer of paper, said tongue extending through said hole in the one layer of paper and through the tube aperture and therein deformed to hold said paper to said tube and seal the paper around said hole to said tube around said aperture whereby the space within the innermost convolution of the paper communicates with the space within the tube.

2. The invention defined by claim 1, together with a spacing strip wrapped spirally about the center tube and between the convolutions of the paper.

3. The invention defined by claim 1, together with a mesh separator between the folds of paper.

4. A filter comprising a housing, a center post disposed axially in said housing, a filter element as defined by claim 1 assembled in said housing with the tube around the post providing an annular space between the post and tube, means to seal said annular space from the remainder of the space within the housing, inlet means for said housing and conduit means leading from said annular space.

5. A filter comprising a housing, a center post disposed axially in said housing, a filter element as defined by claim 1 assembled in said housing with the tube around the post providing an annular space between the post and tube, means to seal said annular space from the remainder of the space within the housing, inlet means for said housing and conduit means leading from said annular space and extending through said post.

6. A filter comprising a housing, a center post disposed axially in said housing, a filter element as defined by claim 1 assembled in said housing with the tube around the post providing an annular space between the post and tube, means to seal said annular space from the remainder of the space within the housing, inlet means for said housing and conduit means leading from said annular space, together with a by-pass in said post between said housing chamber and said annular space.

7. A filter element comprising a conduit having an aperture in a wall thereof, a double layer of filter material, sealing means securing said double layer together along the perimeter of a closed figure to provide an enclosed space between said double layer, a securing plate positioned in said space, a tongue bent from said securing plate, a hole larger than said tongue in one layer of said double layer, said tongue extending through said hole in the one layer and into the aperture of said conduit, said tongue being deformed within said conduit to secure said plate and double layer of filter material to said conduit with the periphery of said hole in sealing relation to said tube about the aperture.

8. A filter element as defined by claim 7, together with a mesh separator in the enclosed space between said double layer of filter material, said securing plate being U-shaped in cross section and surrounding an edge portion of said mesh separator.

9. A filter element comprising a conduit having an aperture in a wall thereof, a double layer of filter material, sealing means sealing said double layer together along the perimeter of a closed figure to provide an enclosed space, a portion of said double layer having a hole in one of said layers being positioned over said aperture and in sealing contact with said conduit around said hole and aperture, securing means positioned within said space and covering said aperture, a projection on said securing means smaller than said hole extending through said hole in the layer of filter material between said securing means and said conduit and entering said aperture, said projection being secured to said conduit.

HERBERT G. KAMRATH.

REFERENCES CITED

The following references are of record in the file of this patent:

UNITED STATES PATENTS

| Number | Name | Date |
|---|---|---|
| 1,693,717 | Lienesch | Dec. 4, 1928 |
| 1,742,768 | Kamrath | Jan. 7, 1930 |
| 1,805,903 | Bull | May 9, 1931 |